March 31, 1936.  H. C. MacBRAIR ET AL  2,036,179
VULCANIZING APPARATUS
Filed May 18, 1933   2 Sheets-Sheet 1
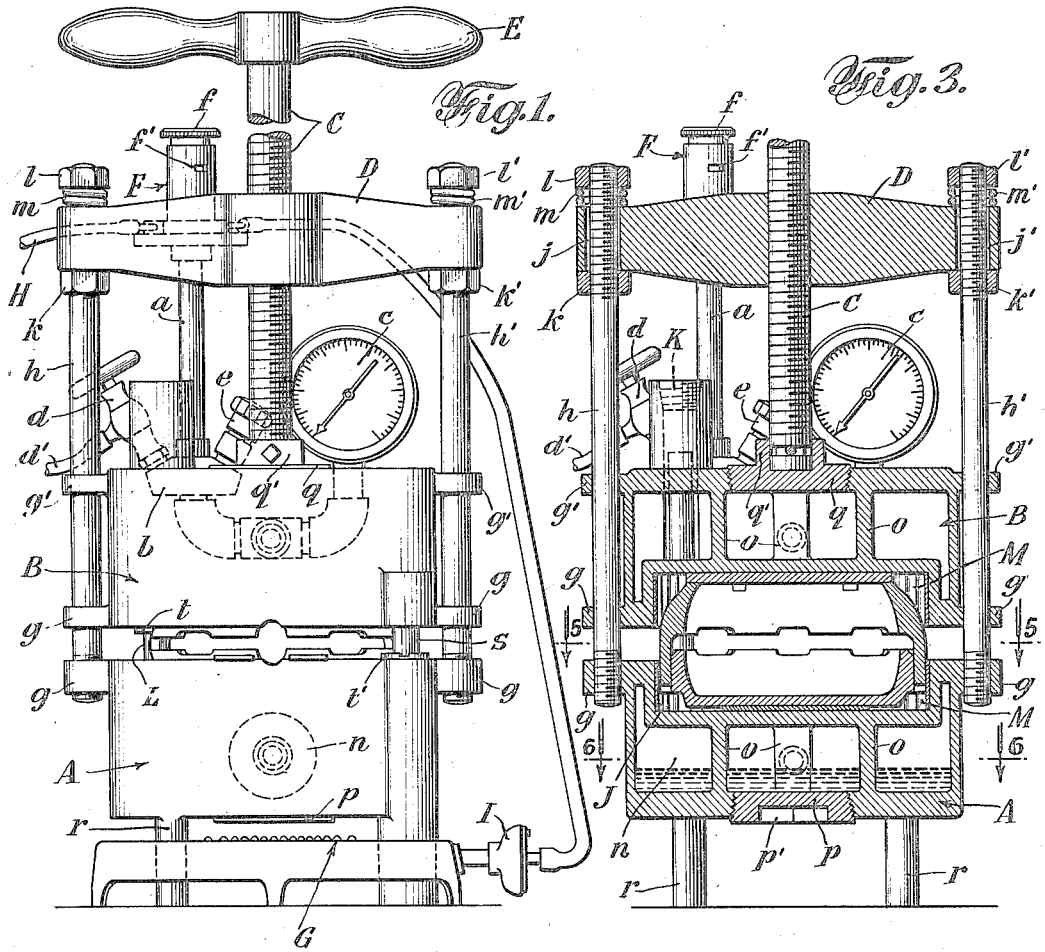
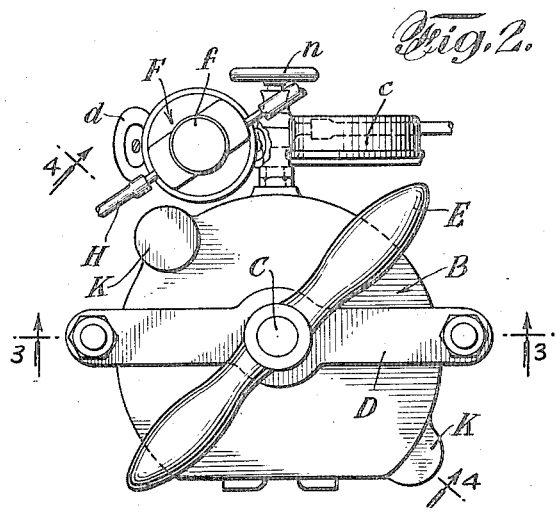
INVENTORS
Henry C. Mac Brair,
Henry C. Mac Brair, Jr.
BY
ATTORNEY March 31, 1936. H. C. MacBRAIR ET AL 2,036,179
VULCANIZING APPARATUS
Filed May 18, 1933 2 Sheets-Sheet 2
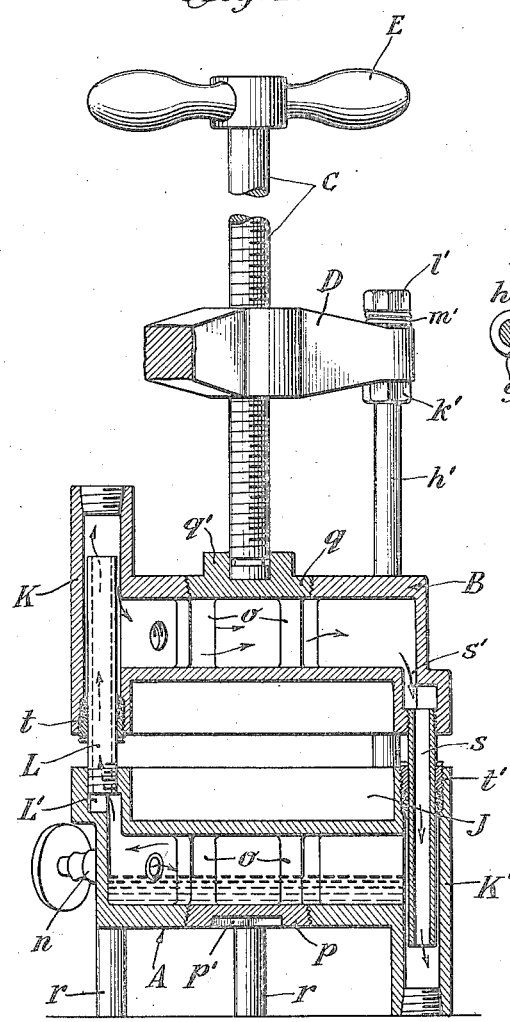
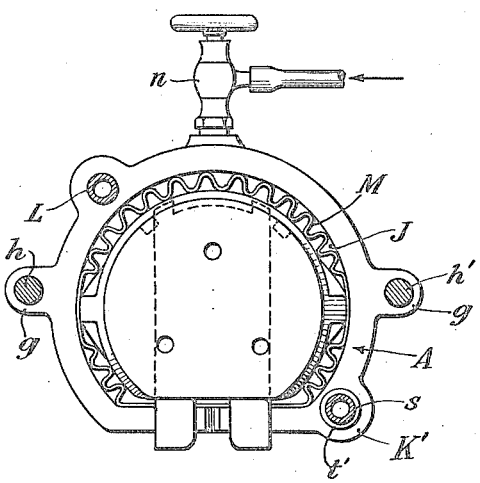
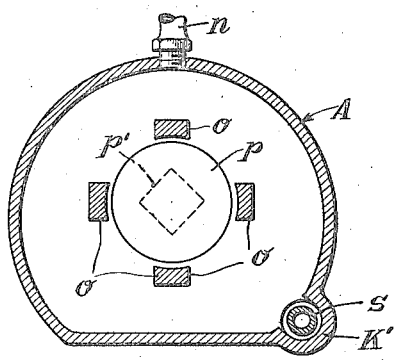
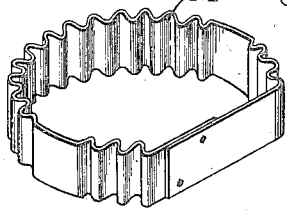
INVENTORS
Henry C. MacBrair,
Henry C. MacBrair, Jr.
BY
ATTORNEY Patented Mar. 31, 1936

2,036,179

UNITED STATES PATENT OFFICE 2,036,179

VULCANIZING APPARATUS

Henry C. MacBrair and Henry C. MacBrair, Jr., Middletown, N. Y.

Application May 18, 1933, Serial No. 671,656

5 Claims. (Cl. 18—17)

The invention relates to a vulcanizing apparatus and such a one as is especially designed for the use of dentists in making up plates with teeth. While it may be used with the ordinary materials, heretofore employed for such purposes, it is particularly well adapted for synthetic resins which are now coming into vogue as plate material.

Such resins have already been used, but when using them with the ordinary vulcanizer, it is almost imperative that alcohol or other more or less dangerous solvents be employed in the vulcanizer chamber and in which the plate, enclosed in the flask, is submerged. Furthermore, in using these synthetic resins, heat and pressure must be controlled within close limits in order to get a strong dense and perfect plate.

In illustrating the invention, we have applied, as far as possible, a number of elements heretofore used in the ordinary closed steam vulcanizer and have, in part, through these elements, been able to produce a much simplified device, as illustrated in the accompanying drawings.

Referring to the drawings:

Figure 1 is a vertical view of the device shown as applied to a simple form of gas plate burner.

Figure 2 is a view in plan, from the top of Figure 1.

Figure 3 is a vertical sectional view on the line 3—3 of Figure 2, showing a dental flask in place.

Figure 4 is a similar vertical sectional view on the line 4—4 of Figure 2.

Figure 5 is a cross section on the line 5—5 of Figure 3.

Figure 6 is a cross section on the line 6—6 of Figure 3.

Figure 7 is a detailed view of one form of heat transferring lining between the inner walls of the vulcanizing elements and the flask.

In the accompanying drawings, A, indicates the lower section of the vulcanizer, B, the upper section, and C, the screw for exerting pressure on the upper section B. D, is a cross head through which the pressure screw C, is threaded while E, is the handle or wheel for turning the pressure screw C.

F, indicates an automatic controlling device for controlling the flow of gas to the burner G, which gas receives its supply through a gas supply tube H, which after passing through the automatic control F, is connected with the usual type of gas and air mixer I.

The gas and air mixer may be set to the desired point to give the most efficient flame at the burner G. Thereafter, the automatic control F, will, through its adjusting barrel $f$, be regulated and set so that its dial $f'$, will show the desired pressure to be used and when this pressure is reached, the automatic control F, will lower or raise the flame so that the pressure will not lower or rise from the point set on the automatic control and a substantially constant pressure and temperature will be maintained.

It is, of course, possible that the temperature may show a correct reading for the control while the pressure may show a different figure. Therefore, we attach the stem $a$, to a manifold $b$, which leads to a visual pressure gauge $c$, and also to a hand controlled blow-off valve $d$, and an automatic safety blow-off valve $e$, the latter, of course, being always set at the extreme high point to prevent the apparatus bursting under pressure.

Both the lower and upper sections A, and B, have lugs $g$, $g'$, these lugs being diametrically opposite each other and being provided with threaded openings in which guide posts $h$, $h'$, are firmly screwed. These guide posts have a sliding fit in openings in the lugs $g$, $g'$, and at their upper ends, pass through openings $j$, $j'$, at opposite ends of the cross head D. These guide posts $h$, $h'$, have a certain amount of adjustment through nuts $k$, $k'$, and $l$, $l'$.

There are intermediate cushions, springs or the like, $m$, $m'$, which are heavy enough to take up the first pressure strains as the press is closed.

The valve $d$, has a nipple to which a hose $d'$, may be attached for blowing off the vulcanizer to any distant point and for transmitting a cooling media to the interior of the vulcanizer to give a quick cooling effect upon the flask and its contents.

This practice seems to be more satisfactory than merely removing the flask, after it has been taken up to its high temperature, and cooling it by plunging it into a vessel of cold water. In fact, it gives a diminished cooking effect on the resin and this may be slower or faster, according to the circulation of water through the valve $d$, with the valve of the lower chamber $n$.

Each section of the vulcanizer, A, B, has supporting stanchions $o$, which immediately strengthen the chamber and there is a depression J, which serves as a recess wherein the lower section of the flask rests.

For purposes of cleansing and manufacture, a tapered plug $p$, is inserted in the bottom of the lower section A, and has a suitable wrench opening therein $p'$. The upper section B, is of substantially identical construction and has a plug $q$, with a wrench hold $q'$, and a central opening which receives the end of the screw C.

It will be seen that all parts are thus readily assembled and may be disassembled for cleansing and adjustment or for any other purposes.

Depending from the lower end of the section A, are legs $r$, and these, when used with a simple type of gas stove, pass through openings, cut in the upper grating of the stove, so that they may rest upon a fixed surface.

Diametrically opposite each other and slightly removed from the posts $h, h'$, there is a steam riser K, passing through a lug cast on the upper section B, and a similar steam riser K', likewise cast in a lug and extending downward to form a foot.

A steam duct or pipe L, is screwed into a socket in the lower section A, leaving a steam passageway L', thereto, and a similar pipe or duct $s$, screws into the upper member which is provided with a steam duct $s'$. The pipe L, has a compression packing $t$, located in the steam riser K, and the duct $s$, has a compression packing $t'$, located in the riser K'.

It will be observed, from the above description, that the vulcanizer chambers in the lower member A, and upper member B, may be filled with a sufficient quantity of water, either through a valve $n$, or through the valve $d$. As heat is applied, there will be a circulation of heat through the pipe L, into the upper steam chamber and therefrom through the duct $s$, to the lower steam chamber. The lower member A, and upper member B, may be moved toward or from each other by the movement of the pipes L, s, respectively, in their packings in the steam risers K, K'. There will be comparatively no loss of water unless in blowing off, in order to reduce the pressure and cool the device, inasmuch as there is a closed circuit.

To enhance the value of securing the best economy in heat transferred to the flask, we place about the flask receptacles, in the upper and lower members, corrugated conducting members M, which fit within the chambers of the press and snugly fit about the flask. These provide against cooling the major portion of the flask as it is closed down. They may be made in any convenient form and size to best effect the results desired to prevent complete cold air gapping between the heated portions of the press members during the operation of the vulcanizer. Any other desirable means of maintaining heat may be utilized.

It will be observed that the flasks and their contents are observable through openings formed in the flask members, a feature which is important in utilizing synthetic resins, as the softening point and melting point may be carefully observed during the application of heat and pressure to the device.

It is believed the device, herein described, overcomes many of the difficulties heretofore encountered in vulcanization.

There are two superimposed chambers interconnected to give equalization of temperature in both chambers and a means for applying mechanical pressure so that the flask and its contents can be put under any desired pressure at the most desirable temperature.

There is provided a simple means for securing conductive heat to the top and bottom of the vulcanizer and to the sides of the flask which is subjected to heat and pressure. The flask is divided in equal halves in a plane parallel to the base of the flask with openings which permit observation during the progress of vulcanization.

As the top and bottom platens of the press are moved toward each other, provision is made for always conveying steam from the lower to the upper press and throwing back the condensate to the lower chamber, thus giving a syphonic flow from bottom to top and condensing back to the bottom chamber. This provides high efficiency with a small body of water or other heating media.

Provision is made through vent cocks, at the top and bottom, to prevent blowing off the steam and permit emptying the condensate, giving a quick cooling and by introduction of water in a circulating manner, thus cooling may be materially hastened. The cocks at the top and bottom will give an indication of water level by filling through the top cock until water flows through the open bottom cock.

Regulated temperature with steam may be held to a constant temperature for any given period of time and with regulated pressure. The inner lining of high conductivity, preferably a corrugated metal, arranged in the chambers of the top and bottom sections of the press, will produce a conductive heat from the steam chests to the vulcanizer press and provide a heat veil across the gap between the top and bottom sections, while they are open. By this arrangement, a generated heat during vulcanization is always directly transferred by conduction from the upper and lower steam chests to the top and bottom of the flask. At the same time, the outer sides of the flask are receiving the heat by conduction and there is convective heating in conjunction with the shield which prevents over radiation and lowering of temperature of the flask. Therefore, the interior heat of the flask is automatically controlled by the temperature and the pressure developed in the upper and lower steam chambers.

Of course, electric platens may be employed and have been used for heating the top and bottom of the flask. The advantages of utilizing steam, as herebefore described, resides in a definite temperature above, below and about the flask, whereas the electric platen type gives a heating take off about the flask and transfers its heat only through the top and bottom thereof. Heat energy is thus dissipated entirely about the sides.

The ability to use standard types of fittings, as an economy in building, is important in the steam vulcanizer. Economy in operation, through concentration of heat at the machine, without great opportunities of radiation to the exterior of the device, is commendable.

The device is easily assembled and taken down.

The guide rods, diagonally opposed to each other, with the diagonal line passing through the center of application of pressure and the steam tubes, likewise diagonally opposed, serve to prevent binding of the mechanism or twisting of the upper and lower chambers with reference to each other.

An assembly, modified from the usual form employed in water vulcanizers, is modified to carry a pressure gauge indicator, a blow off for bursting steam pressures, a control valve for reducing pressure and introducing water and a temperature regulating device for automatically controlling the gas or other heating media to hold the chambers at a definite predetermined temperature. These are all combined in the present application to give substantially an efficient automatic control.

Of course, the device may be modified, as to design and parts, without materially affecting the scope of the invention herein claimed and it is contemplated that any modifications may be made to improve the effectiveness of the device without departing from the spirit or intent of the invention, one form of which is illustrated in more or less detail in the drawings.

The vulcanizer is particularly well adapted for synthetic resins, such as vinyl, and its series of coal tar products which are now used in place of the phenol resins which are produced under various trade names but all of which carry a phenol aldehyde reaction. Any of the synthetic resins are adaptable to a vulcanizing press, as defined herein, due in a great sense to the exact heat control and pressure which could be given with great precision. Vinyl resins are by-products of natural gas. We have found great difficulty in using these resins in ordinary platen presses or even in vulcanizers employing alcohol as a liquid and have found that a temperature of over 270° tends to blacken and destroy the color, whereas with the open press, herein described, the investment may be made in flasks, each carrying as high as one half of the matter to be vulcanized with an intermediate substantially hard blank of resin, will stand temperatures up to 250° or 260°, when they become plastic and are pressed into perfect forms with a pressure of 5000 pounds or more. The whole operation may be brought up to its final point in some twenty minutes. If cooled too rapidly, the material becomes quite brittle, therefore, the conductive shields will maintain quite a temperature as the pressure is lowered and cooling is made quite rapid in the vulcanizer chamber.

What we claim as our invention and desire to secure by Letters Patent is:

1. In a vulcanizer having two main sections, each provided with a steam chamber and each having a chamber registering with the other to carry a vulcanizing flask, a lining for each of said second named chambers for conducting heat to the sides of the flask, means for circulating steam through said chambers, cocks through which steam may be evacuated from the chambers and water introduced therein to a desired level and means for compressing one section upon the other to exert pressure upon the flask.

2. In a vulcanizer having two sections, a chamber formed partially in each section of compressible heating members and a lining for each of said chambers for conducting heat to the sides of an intermediate member.

3. In a vulcanizer having two sections, a chamber formed partially in each section of compressible heating members and a resilient lining for each of said chambers for conducting heat to the sides of an interposed member.

4. In a vulcanizer having two sections, a chamber formed partially in each section of compressible heating members, a lining for each of said chambers for conducting heat to the sides of an intermediate member and a two part intermediate member fitting within the lining.

5. A vulcanizer of the character described having a lower section with a heating chamber and a superimposed upper section with a heating chamber, each section having a recess for the reception of an intermediate member to which heat and pressure are to be conveyed, means for exerting pressure on the superimposed section toward the lower section to exert pressure on the intermediate heat absorbing member; interconnections for the heating chambers for the upper and lower sections, means for heating the lower section, an automatic adjustable thermo control for the heat, controlling the source of supply for heating, a steam gauge and safety valve and a manually controlled cock all mounted on a single manifold.

HENRY C. MacBRAIR.
HENRY C. MacBRAIR, Jr.